US009605605B2

(12) United States Patent
Ideshio et al.

(10) Patent No.: US 9,605,605 B2
(45) Date of Patent: Mar. 28, 2017

(54) VEHICLE CONTROL APPARATUS

(75) Inventors: Yukihiko Ideshio, Nisshin (JP); Terufumi Miyazaki, Toyota (JP); Yuji Inoue, Nisshin (JP); Shingo Eto, Gamagori (JP); Yousuke Michikoshi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 14/361,875

(22) PCT Filed: Dec. 9, 2011

(86) PCT No.: PCT/JP2011/006888
§ 371 (c)(1),
(2), (4) Date: May 30, 2014

(87) PCT Pub. No.: WO2013/084269
PCT Pub. Date: Jun. 13, 2013

(65) Prior Publication Data
US 2015/0122203 A1 May 7, 2015

(51) Int. Cl.
*F02D 25/02* (2006.01)
*B60K 6/48* (2007.10)
(Continued)

(52) U.S. Cl.
CPC ............. *F02D 25/02* (2013.01); *B60K 6/387* (2013.01); *B60K 6/48* (2013.01); *B60K 6/547* (2013.01); *B60W 10/02* (2013.01); *B60W 10/06* (2013.01); *B60W 10/08* (2013.01); *B60W 20/00* (2013.01); *B60W 20/40* (2013.01); *B60W 30/18054* (2013.01); *F02D 29/02* (2013.01); *B60K 2006/268* (2013.01); *B60W 2710/0644* (2013.01); *Y02T 10/6221* (2013.01); *Y02T 10/6286* (2013.01)

(58) Field of Classification Search
CPC ........... F02D 25/02; B60K 6/387; B60K 6/48; B60W 10/06
See application file for complete search history.

(56) References Cited

U.S. PATENT DOCUMENTS 5,845,756 A * 12/1998 Dairokuno ............. B60K 23/02
192/113.3
2005/0079942 A1* 4/2005 Bauknecht ............. B60K 6/365
475/5

(Continued)

FOREIGN PATENT DOCUMENTS

JP H11-82260 A 3/1999
JP 2000-071815 A 3/2000

(Continued)

*Primary Examiner* — Carlos A Rivera
*Assistant Examiner* — Kevin Lathers
(74) *Attorney, Agent, or Firm* — Oliff PLC

(57) ABSTRACT

Provided is a vehicle control apparatus. To start an engine by a motor-generator under the state that a vehicle is stopped, the vehicle control apparatus synchronizes a rotation of the engine with a rotation of the motor-generator at a synchronous rotational speed lower than a target rotational speed to start the engine, and increases a rotational speed of the engine by the motor-generator from the synchronous rotational to the target rotational speed, and starts the engine at the target rotational speed.

6 Claims, 6 Drawing Sheets

(51) Int. Cl.
*B60K 6/547* (2007.10)
*B60W 10/06* (2006.01)
*B60W 10/08* (2006.01)
*B60W 20/00* (2016.01)
*B60W 10/02* (2006.01)
*B60W 30/18* (2012.01)
*B60W 20/40* (2016.01)
*B60K 6/387* (2007.10)
*F02D 29/02* (2006.01)
*B60K 6/26* (2007.10)

(56) References Cited

U.S. PATENT DOCUMENTS

| | | | |
|---|---|---|---|
| 2007/0205036 A1* | 9/2007 | Ogata | B60K 6/48 180/337 |
| 2011/0132307 A1* | 6/2011 | Patterson | F02N 11/0814 123/179.3 |
| 2011/0168117 A1* | 7/2011 | Bolander | F02N 11/0848 123/179.3 |
| 2012/0290158 A1 | 11/2012 | Yoshikawa | |

FOREIGN PATENT DOCUMENTS

| | | |
|---|---|---|
| JP | 2002-089417 A | 3/2002 |
| JP | A-2007-120368 | 5/2007 |
| JP | A-2010-201962 | 9/2010 |
| WO | 2011/092856 A1 | 8/2011 |

\* cited by examiner

VEHICLE CONTROL APPARATUS

TECHNICAL FIELD

The present invention relates to a vehicle control apparatus.

BACKGROUND ART

In recent years, there has been focused on a hybrid vehicle as one type of vehicle of environment-friendly automobiles. The hybrid vehicle has driving sources including an internal combustion engine (hereinafter referred to as "engine") powered by fuel such as, for example, gasoline, and an electric motor (hereinafter referred to as "motor") powered by electric power from a battery.

There has already been developed an above mentioned type of a hybrid vehicle mounting a vehicle control apparatus (see, for example, Patent Document 1). The vehicle control apparatus includes an engine, a motor, a clutch, and a control unit. The clutch is adapted to connect and disconnect between the engine and the motor. To start the engine, the vehicle control apparatus is designed to engage the clutch and to drive the engine to start rotating through the engaged clutch by the motor.

As shown in FIG. 5, at a time $T_0$ under the state that the engine is stopped while the hybrid vehicle is stopped, the control unit controls the motor to start rotating in order to drive the engine to start rotating in response to an engine start request flag turned "ON". After that, the control unit controls the motor to increase a motor rotational speed $N_M$. After the motor rotational speed $N_M$ reaches a target rotational speed capable of starting the engine at a time $T_1$, the control unit controls a clutch to take an engaging state from a disengaging state by turning a clutch flag "ON".

To start the engine, the motor is required a load torque increased to a level capable of driving the engine to start rotating through the clutch taken the engaging state. The control unit is therefore configured to calculate, before the clutch takes the engaging state, the load torque to be increased for driving the engine to start rotating and set the calculated load torque as a compensating torque $T_M$ of the motor. In addition, the control unit is configured to control the motor to increase an output torque by the compensating torque $T_M$ at the time of the clutch taking the engaging state.

As shown in FIG. 5, a clutch torque $T_C$ is increased in response to changing the clutch to take the engaging state from the disengaging state at the time $T_1$. The control unit is configured to increase the compensating torque $T_M$ along the increase of the clutch torque $T_C$ keeping the compensating torque $T_M$ slightly less than the clutch torque $T_C$.

The engine has a crankshaft driven by the motor through the clutch. In response to changing the clutch to take the engaging state from the disengaging state, a rotational speed of the crankshaft, i.e., an engine rotational speed $N_E$ is gradually increased. In case that the clutch is completely engaged at a time $T_2$, the engine rotational speed $N_E$ is synchronized with the motor rotational speed $N_M$ at the target rotational speed. The engine is therefore driven to start rotating by the motor.

CITATION LIST

Patent Literature

{Patent Document 1}
  Japanese Patent Application Publication No. 2010-201962

SUMMARY OF INVENTION

Technical Problem

The conventional vehicle control apparatus, however, encounters such a problem that friction loss due to slipping of the clutch is increased. As shown in FIG. 5, the clutch begins slipping at a time $T_S$ after taking the engaging state from the disengaging state in response to the clutch flag turned "ON". The clutch causes therein a clutch loss, i.e., a friction loss represented by an area filled with diagonal lines in FIG. 5 from the time $T_S$ to a time at which the clutch is completely engaged.

Here, time periods A to C are hereinafter defined. The time period A is defined as a time period from a time when the motor starts rotating to a time when the clutch flag is turned "ON". The time period B is defined as a time period during which the clutch is varied to take the engaging state from the disengaging state. The time period C is defined as a time period from a time when the clutch is completely engaged to a time when the engine is firstly ignited. As shown in FIG. 6, when comparing power consumption of the motor within each time periods A to C with one another, a ratio of power consumption due to the clutch loss represented by an area filled with diagonal lines in FIG. 6 is the largest within the time period B.

The inventors of the present application found, after diligent researches, the reason why the friction loss from the clutch becomes the largest within the time period B is mainly due to the fact that the engine rotational speed $N_E$ is synchronized with the motor rotational speed $N_M$ at the target rotational speed to start the engine. This means that, because of the fact that the engine rotational speed $N_E$ is synchronized with the motor rotational speed $N_M$ at the target rotational speed, the slipping of the clutch occurs within a long time period where the engine rotational speed $N_E$ increases from 0 to the target rotational speed. Therefore, the clutch loss becomes large.

The large friction loss from the slipping clutch while starting the engine leads to the fact that the power consumption of the motor becomes large. This results in a problem that downsizing of a battery is difficult, as well as fuel efficiency is deteriorated.

The present invention has been made to solve the foregoing problem, and has an object to provide a vehicle control apparatus, applied to a vehicle including a clutch between an engine and a motor, which can decrease the friction loss due to slipping of the clutch while the engine is started by the motor.

Solution to Problem

To solve the above-mentioned problem, a vehicle control apparatus according to the present invention includes: an internal combustion engine; an electric motor connected with wheels of a vehicle; and a clutch that takes a transmission state between a disengaging state where the internal combustion engine is disconnected from the electric motor and an engaging state where the internal combustion engine is connected with the electric motor, wherein the vehicle control apparatus is designed to start the internal combustion engine by the electric motor after making the clutch take the engaging state, and characterized to synchronize a rotation of the internal combustion engine with a rotation of the electric motor at a synchronous rotational speed lower than a target rotational speed with controlling the clutch to take the engaging state from the disengaging state to start the internal combustion engine by the electric motor under the state that the vehicle is stopped, increase a rotational speed of the internal combustion engine by the electric motor from the synchronous rotational speed to the target rotational speed, and start the internal combustion engine at target rotational speed.

By the construction as set forth above, the vehicle control apparatus according to the present invention is designed to synchronize the rotational speed of the engine with the rotational speed of the motor at the synchronous speed lower than the target rotational speed, and thereafter to increase the rotational speed of the engine to the target rotational speed before starting the engine.

This leads to the fact that the friction loss due to slipping of the clutch occurs within a time period between a time at which the engine rotational speed is 0 and a time at which the engine rotational speed is synchronized with the motor rotational speed at the synchronous rotational speed lower than the target rotational speed. This means that the time period during which the clutch loss occurs becomes shorter than the long time period during which the clutch loss occurs to the conventional vehicle control apparatus within a long time period between a time at which the engine rotational speed is 0 and a time at which the engine rotational speed reaches the target rotational speed, thereby making it possible to decrease the clutch loss. Because of the fact that the clutch loss is decreased, the power consumption of the motor in starting the engine is reduced. Therefore, the vehicle control apparatus according to the present invention can downsize the battery and improve fuel efficiency. In addition, because of the fact that the power consumption of the motor is reduced, the vehicle control apparatus according to the present invention can improve start-up performance of the engine even if the output voltage of the battery is lowered under low temperature environment.

In the description of the present application, a disengaging state of the clutch arranged between the engine and the motor is intended to represent a state where the engine is completely disconnected from the motor. Moreover, an engaging state of the clutch is intended to represent a state where the engine is completely connected with the motor without slipping of the clutch, as well as a state defined as a loosely engaging state where slipping between the motor and the engine occurs.

The vehicle control apparatus according to the present invention may further include a wheel disconnecting clutch that takes a transmission state between a disengaging state where the wheels are disconnected from the electric motor and an engaging state where the wheels are connected with the electric motor, wherein the vehicle control apparatus is designed to have the wheel disconnecting clutch take the disengaging state at least after the rotation of the internal combustion engine is synchronized with the rotation of the electric motor.

By the construction as set forth above, the vehicle control apparatus according to the present invention is designed to remove a load of a driving wheel side from the motor after the rotation of the engine is synchronized with the rotation of the motor, thereby securing the output torque of the motor. Therefore, the motor can drive the engine to start rotating without decreasing the rotational speed under the condition that the motor is subjected to the load torque required to drive the engine to start rotating after the rotation of the engine is synchronized with the rotation of the motor.

The vehicle control apparatus according to the present invention may be designed to have the wheel disconnecting clutch take the disengaging state in response to starting rotation of the electric motor.

By the construction as set forth above, the vehicle control apparatus according to the present invention is designed to remove a load of a driving wheel side from the motor after starting the motor, thereby securing the output torque of the motor. Therefore, the vehicle control apparatus according to the present invention can reduce power consumption needed to increase the motor rotational speed to the synchronizing speed, and power consumption needed to increase the engine rotational speed $N_E$ to synchronize with the motor rotational speed $N_M$. Because of the fact that power consumption is reduced, the vehicle control apparatus according to the present invention can downsize the battery and improve fuel efficiency.

The vehicle control apparatus according to the present invention may further include a mechanical oil pump driven by the electric motor, wherein the clutch is actuated with hydraulic oil discharged from the oil pump.

By the construction as set forth above, the vehicle control apparatus according to the present invention does not need to be provided with an electrical-type oil pump, thereby resulting in the fact that the vehicle control apparatus according to the present invention can simplify an electric system in comparison with a vehicle control apparatus provided with the electrical-type oil pump. In addition, the mechanical-type oil pump mounted on the automatic transmission for the purpose of shifting a gear position can be applied for supplying the hydraulic oil not only to circulate the torque converter, but also to actuate the clutch, thereby resulting in the fact that the vehicle control apparatus according to the present invention can prevent the number of components from being increased.

In the vehicle control apparatus according to the present invention, the synchronous rotational speed may be higher than a rotational speed to actuate the clutch by the oil pump. By the construction as set forth above, the synchronous rotational speed can be determined to a minimum speed needed to actuate the clutch driven by the oil pump, thereby resulting in the fact that the vehicle control apparatus according to the present invention can minimize the clutch loss with ensuring the clutch to be actuated.

Advantageous Effects of Invention

The present invention provides a vehicle control apparatus, applied to a vehicle including a clutch between an engine and a motor, which can decrease the loss due to slipping of the clutch while the engine is started by the motor.

DESCRIPTION OF EMBODIMENTS

The preferable embodiment of the present invention will hereinafter be described with reference to accompanying drawings. The present embodiment of the vehicle control apparatus according to the present invention is applied to a drive unit of a hybrid vehicle.

At first, the construction will be explained.

Figure 1:
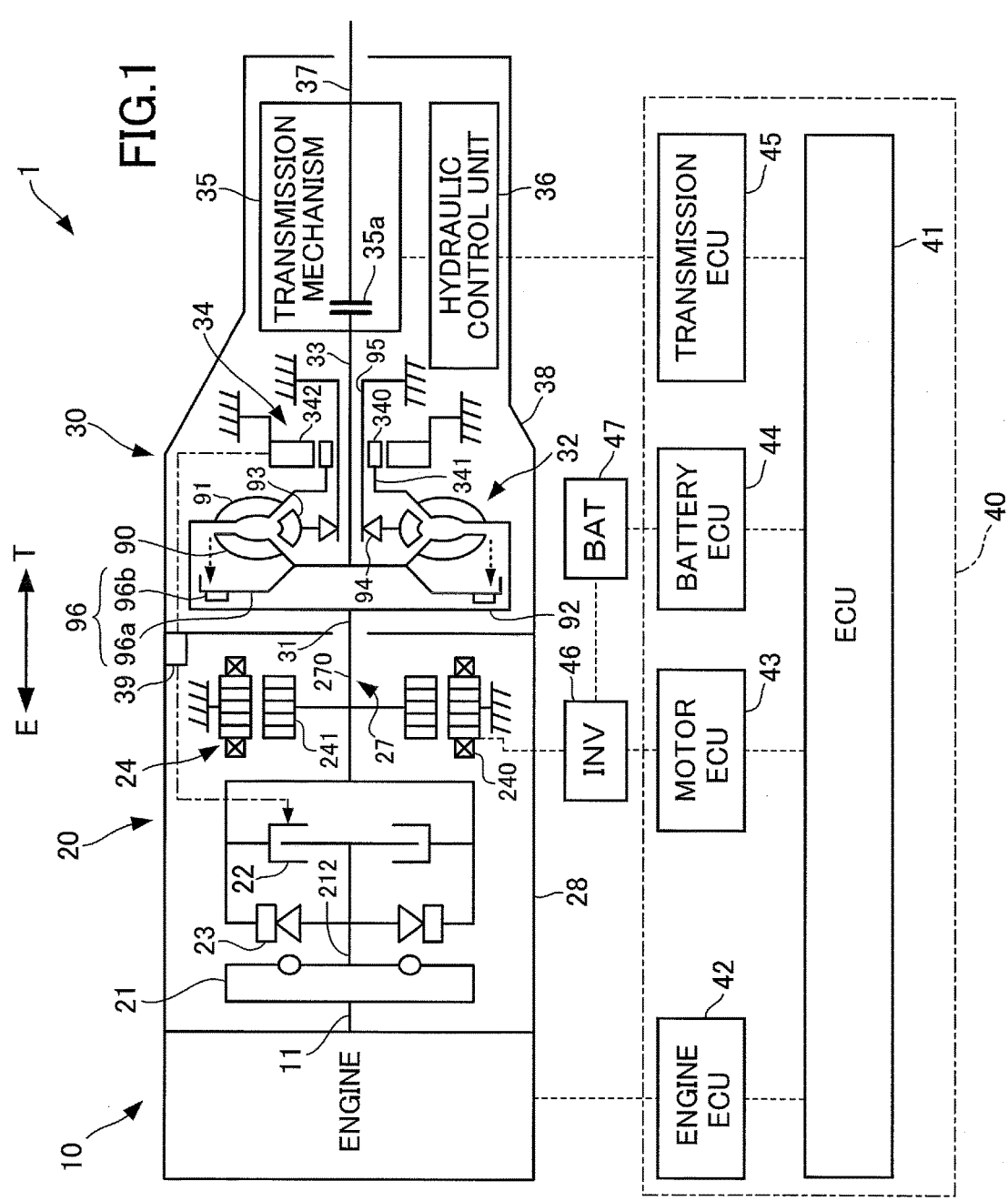
FIG. 1 is a schematic skeleton diagram of a drive device having a vehicle control apparatus according to an embodiment of the present invention.
Figure 2:
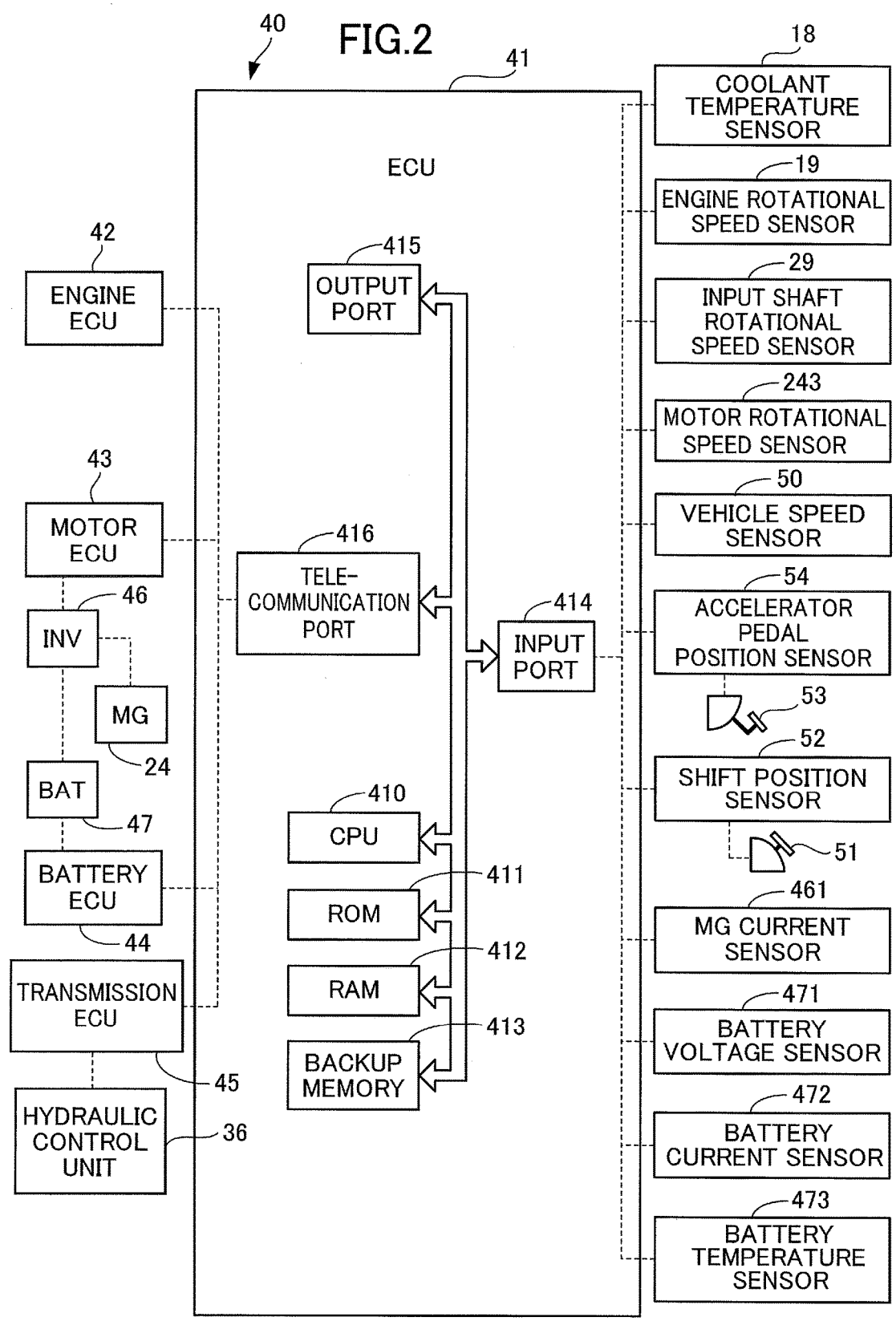
FIG. 2 is a schematic diagram of a control unit of the vehicle control apparatus according to the embodiment of the present invention.

As shown in FIGS. 1 and 2, the drive unit 1 includes an engine 10, a driving unit 20, an automatic transmission 30, and a control unit 40. In the present embodiment, a direction of the drive unit 1 toward the engine 10 is defined as an engine side E, and a direction of the drive unit 1 toward the automatic transmission 30 is defined as an automatic transmission side T.

The engine 10 is constituted by a heretofore known power unit. The engine 10 is designed to output driving force by combusting mixture gas of hydrocarbon fuel and air in a combustion chamber not shown in the drawings. The hydrocarbon fuel includes such as, for example, gasoline or light oil. The engine 10 constitutes an internal combustion engine according to the present invention. The engine 10 is provided with a crankshaft 11 connected with pistons to transmit the driving force. The pistons are arranged inside a cylinder block. The pistons and the cylinder block are not shown in the drawings. The engine 10 is designed to reciprocate pistons to rotate the crankshaft 11 by repeating a cycle of intake, compression, explosion and exhaust of the mixture gas in the combustion chamber. The engine 10 is adapted to transmit torque from the crankshaft 11 to the driving unit 20.

The crankshaft 11 is provided with an engine rotational speed sensor 19. The engine rotational speed sensor 19 is adapted to detect a rotational speed of the crankshaft 11 to transmit a signal indicative of the rotational speed of the crankshaft 11 to the control unit 40.

The driving unit 20 includes an input portion 21, a clutch 22, a one-way clutch 23, a motor-generator 24, an output portion 27, and a case 28. The motor-generator 24 constitutes an electric motor according to the present invention. The driving unit 20 is arranged between the engine 10 and the automatic transmission 30 to transmit the driving force from the crankshaft 11 of the engine 10 to a transmission input shaft 31 of the automatic transmission 30. The transmission input shaft 31 will hereinafter be described in detail.

The input portion 21 has a clutch input shaft 212. The clutch input shaft 212 is coaxially arranged with the crankshaft 11. The clutch input shaft 212 is connected with the clutch 22 and the one-way clutch 23. The clutch input shaft 212 is integrally rotatable with the clutch 22 and the one-way clutch 23 to transmit the driving force to the clutch 22 and the one-way clutch 23.

The output portion 27 has a clutch output shaft 270. The clutch output shaft 270 is coaxially arranged with the clutch input shaft 212. The clutch output shaft 270 is integrally rotatably connected with the clutch 22 and the one-way clutch 23 to transmit the driving force of the driving unit 20 and the one-way clutch 23 to an external device. The clutch output shaft 270 is integrally rotatably connected with the transmission input shaft 31 of the automatic transmission 30 to transmit the driving force from the driving unit 20 to the automatic transmission 30.

The motor-generator 24 has a stator 240 and a rotor 241. The motor-generator 24 is arranged on a driving force transmission path between the crankshaft 11 and the transmission input shaft 31.

The stator 240 has a stator core and a three phase coil. The three phase coil is wound around the stator core. The stator core is, for example, formed by laminated magnetic steel sheets, and fixed on the case 28. The stator 240 is designed to generate a rotating magnetic field by the three phase coil supplied electric power.

The rotor 241 is arranged inside the stator 240 and has a plurality of permanent magnets embedded therein. The rotor 241 is provided with a motor rotational speed sensor 243. The motor rotational speed sensor 243 is adapted to detect a rotational speed of the rotor 241, i.e., that of the motor-generator 24 to transmit a signal indicative of the rotational speed of the motor-generator 24 to the control unit 40.

The motor-generator 24 is operable as an electric motor driving the rotor 241 to rotate by mutual interaction between a magnetic field generated by the permanent magnets embedded in the rotor 241 and a rotating magnetic filed generated by the three phase coil. The motor-generator 24 is also operable as an electric generator generating electric power between both ends of the three phase coil by mutual interaction between the magnetic field generated by the permanent magnets embedded in the rotor 241 and rotation of the rotor 241.

The motor-generator 24 is connected with an inverter 46. The inverter 46 is connected with a battery 47. Consequently, the motor-generator 24 and the battery 47 are capable of transferring electric power to each other through the inverter 46. The battery 47 functions to charge therein the electric power generated by the motor-generator 24 or to discharge therefrom the electric power in response to operating conditions of the hybrid vehicle.

The inverter 46 has power lines to connect with the motor-generator 24. At least one of the power lines is provided with an MG current sensor 461. The MG current sensor 461 is arranged to detect a phase current to transmit a signal indicative of the phase current to the control unit 40. The battery 47 has output terminals and is provided with a battery voltage sensor 471 between the output terminals. The battery voltage sensor 471 is arranged to detect an output voltage of the battery 47 to transmit a signal indicative of the output voltage of the battery 47 to the control unit 40. Any of the output terminals of the battery 47 is provided with a battery current sensor 472. The battery current sensor 472 is arranged to detect a discharge and charge current of the battery 47 to transmit a signal indicative of the current of the battery 47 to the control unit 40. The battery 47 is provided with a battery temperature sensor 473. The battery temperature sensor 473 is arranged to detect temperature of the battery 47 to transmit a signal indicative of the temperature of the battery 47 to the control unit 40.

The clutch 22 includes a multiple disc portion and a piston portion. The multiple disc portion and the piston portion are not shown in the drawings. The clutch 22 is arranged between the input portion 21 and the output portion 27. The clutch 22 is installed between the crankshaft 11 and the transmission input shaft 31, and adapted to connect and disconnect between the crankshaft 11 and the transmission input shaft 31. This means that the clutch 22 is adapted to take a transmission state between a disengaging state where the engine 10 is disconnected from the motor-generator 24 and an engaging state where the engine 10 is connected with the motor-generator 24.

The clutch 22 is of a normally-open type. The clutch 22 is normally opened to ensure that the motor-generator 24 is disconnected from the engine 10. The clutch 22 is actuated with high pressure hydraulic oil discharged from an oil pump 34 of the automatic transmission 30 to ensure that the motor-generator 24 is connected with the engine 10. The oil pump 34 will hereinafter be described in detail. The clutch 22 is arranged inside an inner circumference of the motor-generator 24.

The multiple disc portion of the clutch 22 has a plurality of friction plates. In case that pressing force of the piston portion is strong, the adjacent friction plates are forcefully pressed against each other. In this case, the friction plates are inhibited from free rotating by friction force between adjacent friction plates, thereby resulting in the fact that the clutch 22 takes the completely engaging state. In case that the pressing force of the piston portion is slightly strong, the adjacent friction plates are pressed against each other to an extent that the adjacent friction plates slip with respect to each other. In this case, the friction plates can be rotatable with respect to each other while being connected with each other to an extent to have frictional resistance, thereby resulting in the fact that the clutch 22 takes the loosely engaging state. The clutch 22 generates heat by the friction between the friction plates rotating under the loosely engaging state. The heat generated by the friction of the friction plates causes heat loss of the clutch 22 defined as clutch loss.

The one-way clutch 23 is arranged between the crankshaft 11 and the transmission input shaft 31, and adapted to transmit only a driving force with a positive rotating direction from the crankshaft 11 to the motor-generator 24 through the transmission input shaft 31. Here, the positive rotating direction is defined as the rotating direction of the crankshaft 11. The one-way clutch 23 is arranged inside the inner circumference of the motor-generator 24. The one-way clutch 23 is located axially adjacent to the clutch 22 inside the inner circumference of the motor-generator 24.

The clutch input shaft 212 is provided with an input shaft rotational speed sensor 29. The input shaft rotational speed sensor 29 is adapted to detect a rotational speed of the clutch input shaft 212 to input the detection result to the control unit 40. The input shaft rotational speed sensor 29 is constituted by such as, for example, a resolver.

The automatic transmission 30 includes the transmission input shaft 31, a torque converter 32, a transmission mechanism input shaft 33, an oil pump 34, a transmission mechanism 35, a hydraulic control unit 36, an output shaft 37 and a housing case 38. The automatic transmission 30 is connected with the motor-generator 24.

The torque converter 32 is of a hydraulic type applying circulating hydraulic oil, and is constructed to transmit driving force outputted from the clutch output shaft 270 of the driving unit 20 to the transmission mechanism 35 through the transmission mechanism input shaft 33. The torque converter 32 includes a turbine runner 90, a pump impeller 91, a front cover 92, a stator 93, a one-way clutch 94, a hollow shaft 95, and a lock-up clutch 96.

The turbine runner 90 and the pump impeller 91 are arranged to face each other to ensure that the turbine runner 90 is positioned at the engine side E. The turbine runner 90 is connected with the transmission mechanism input shaft 33 to rotate integrally with the transmission mechanism 35. The pump impeller 91 is connected with the transmission input shaft 31 through the front cover 92 to rotate integrally with the transmission input shaft 31. The housing case 38 has the hydraulic oil supplied thereinto.

The stator 93 is arranged inside the inner circumference between the turbine runner 90 and the pump impeller 91. The stator 93 is connected with the hollow shaft 95 through the one-way clutch 94. The hollow shaft 95 is fixed on the housing case 38 and has the transmission mechanism input shaft 33 rotatably passed therethrough.

The lock-up clutch 96 has a lock-up piston 96a and a friction member 96b fixed on the lock-up piston 96a. The hydraulic oil flows toward the engine side E as shown by the arrow with doted line in FIG. 1, when the rotational speed of the turbine runner 90 closes to the rotational speed of the pump impeller 91 as a vehicle speed exceeds a certain speed. In this case, the hydraulic oil moves the lock-up piston 96a toward the engine side E, and presses the friction member 96b against the front cover 92.

The lock-up clutch 96 is adapted to take an engaging state due to sliding of the lock-up piston 96a toward the engine side E. Under the engaging state, the friction member 96b is pressed against the front cover 92, and the friction member 96b is frictionally connected with the front cover 92. As a consequence, the front cover 92 is integrally rotatable with the turbine runner 90. The lock-up clutch 96 is adapted to have the transmission input shaft 31 and the transmission mechanism input shaft 33 integrally rotated without slipping by the hydraulic oil. This leads to the fact that the lock-up clutch 96 can improve fuel efficiency.

On the other hand, the lock-up clutch 96 is adapted to take a disengaging state due to sliding of the lock-up piston 96a toward the automatic transmission side T. Under the disengaging state, the friction member 96b is disengaged from the front cover 92, so that the friction member 96b and the front cover 92 are independently rotatable from each other. As a consequence, the front cover 92 is independently rotated from the turbine runner 90.

The oil pump 34 has a rotor 340, a hub 341 and a body 342. The hub 341 has a cylindrical shape, and connects the rotor 340 with the pump impeller 91 to ensure that the rotor 340 and the pump impeller 91 are integrally rotatable. The body 342 is fixed on the housing case 38. In accordance with the above described construction, the oil pump 34 is driven by the driving force from the driving unit 20 to the rotor 340 through the front cover 92 and the pump impeller 91.

The hydraulic oil discharged from the oil pump 34 is supplied not only to the transmission mechanism 35, but also to the clutch 22 in the driving unit 20 as shown by the chain line in FIG. 1. The oil pump 34 is adapted to supply the hydraulic oil to change the gear position or the gear ratio of the transmission mechanism 35 and to change the transmission state of the clutch 22.

The oil pump 34 is provided with a hydraulic pressure regulating valve 39 between the oil pump 34 and the clutch 22. The hydraulic pressure regulating valve 39 is adapted to regulate the amount of the hydraulic oil supplied from the oil pump 34 to the clutch 22 in response to a control signal from the control unit 40.

The oil pump 34 and the hydraulic pressure regulating valve 39 collectively constitute a clutch switching unit. The oil pump 34 and the hydraulic pressure regulating valve 39 are designed to switch the clutch 22 from the disengaging state to the engaging state.

The transmission mechanism 35 has a plurality of clutches and a plurality of brakes. FIG. 1 shows only C1 clutch 35a among the plurality of clutches and the plurality of brakes. The C1 clutch 35a is directly connected with the transmission mechanism input shaft 33 and is integrally rotatable with the transmission mechanism input shaft 33. The C1 clutch 35a constitutes a wheel disconnecting clutch according to the present invention.

The transmission mechanism 35 is designed to form a desired shift range and a desired gear position by switching transmission states of the plurality of clutches and the plurality of brakes each between a disengaging state and an engaging state in response to hydraulic pressure of the oil supplied from the hydraulic control unit 36 in accordance with traveling conditions of the hybrid vehicle. The shift ranges of the transmission mechanism 35 include, for example, an N (neutral) range, a D (drive) range, an R (reverse) range, an M (manual) range, i.e., a sequential range, a 2nd (second) range, a L (low) range, a B (brake) range, an S (sport) range, and a Ds (sport drive) range.

The transmission mechanism 35 is provided a shift lever 51 connected therewith. The shift lever 51 is operated by a driver of the vehicle to change the shift range. The shift lever 51 is provided with a shift position sensor 52. The shift position sensor 52 is adapted to detect a position of the shift lever 51 to transmit a signal indicative of the shift position to the control unit 40.

The driving force outputted from the transmission mechanism input shaft 33 is transmitted to the output shaft 37 through the transmission mechanism 35, and transmitted from the output shaft 37 to wheels through a differential gear not shown in the drawings. This means that the motor-generator 24 is connected with the wheels. While there has been described in this embodiment about the fact that the transmission mechanism 35 is constituted by a stepped automatic transmission, the transmission mechanism 35 is not limited to the stepped automatic transmission. The transmission mechanism 35 may be such as, for example, constituted by a continuous variable transmission.

As shown in FIG. 2, the control unit 40 has an electronic control unit for the vehicle (hereinafter, referred to as "ECU") 41, an electronic control unit for the engine (hereinafter, referred to as "engine ECU") 42, an electronic control unit for the motor (hereinafter, referred to as "motor ECU") 43, an electronic control unit for the battery (hereinafter, referred to as "battery ECU") 44, and an electronic control unit for the transmission mechanism (hereinafter, referred to as "transmission ECU") 45. The control unit 40 constitutes control means.

The ECU 41 has a CPU (Central Processing Unit) 410, a ROM (Read Only Memory) 411 for storing a processing program, etc, a RAM (random Access Memory) 412 for temporarily storing data, a backup memory 413, an input port 414, an output port 415, and a communication port 416. The ECU 41 is operable to supervise the control of the hybrid vehicle.

The input port 414 of the ECU 41 is connected with a coolant temperature sensor 18, the engine rotational speed sensor 19, the input shaft rotational speed sensor 29, the motor rotational speed sensor 243, a vehicle speed sensor 50, and an accelerator pedal position sensor 54, in addition to the shift position sensor 52, the MG current sensor 461, the battery voltage sensor 471, the battery current sensor 472, and the battery temperature sensor 473.

The coolant temperature sensor 18 is adapted to detect temperature of coolant of the engine 10 to transmit a signal indicative of the coolant temperature to the control unit 40. The ECU 41 is configured to detect that residual charge quantity of the battery 47 (SOC: State of Charge) described below is less than a predetermined threshold quantity in order to set an engine start request flag to "ON" under the state that the engine 10 is stopped and the coolant temperature is lower than a certain threshold temperature. This means that the coolant temperature sensor 18 constitutes an engine start request detection unit.

The vehicle speed sensor 50 is adapted to detect the vehicle speed to transmit a signal indicative of the vehicle speed to the control unit 40. The accelerator pedal position sensor 54 is provided with an accelerator pedal 53. The accelerator pedal position sensor 54 is adapted to detect a depressed amount of the accelerator pedal 53 to transmit a signal indicative of the depressed amount to the control unit 41. The ECU 41 is configured to calculate an accelerator pedal position Acc on the basis of the depressed amount of the accelerator pedal 53, the depressed amount being indicated by the signal from the accelerator pedal position sensor 54.

The ECU 41 is connected with the engine ECU 42, the motor ECU 43, the battery ECU 44, and the transmission ECU 45 through the communication port 416. The ECU 41 is configured to exchange various control signals and data with the engine ECU 42, the motor ECU 43, the battery ECU 44 and the transmission ECU 45.

The engine ECU 42 is connected with the engine 10 and the ECU 41. The engine ECU 42 is adapted to input therein signals from various sensors which detect operating conditions of the engine 10. The engine ECU 42 is configured to perform, on the basis of the input signals, operation controls including a fuel injection control, an ignition control, an air suction control, and the like.

The engine ECU 42 is arranged to communicate with the ECU 41. The engine ECU 42 is configured to control the engine 10 on the basis of the control signals from the ECU 41, and to transmit data indicative of the operating conditions of the engine 10 to the ECU 41 as needed.

The motor ECU 43 is connected with the inverter 46 and the ECU 41. The motor ECU 43 is configured to control the motor-generator 24. The motor ECU 43 is arranged to input therein signals needed to control the motor-generator 24. The signals needed to control the motor-generator 24 include such as, for example, a signal from the motor rotational speed sensor 243 of the motor-generator 24, and a signal detected by the MG current sensor 461 indicative of the phase current flowing through the motor-generator 24. The motor ECU 43 is arranged to output a switching control signal to the inverter 46.

The motor ECU 43 is configured to communicate with the ECU 41. The motor ECU 43 is configured to control the motor-generator 24 by controlling the inverter 46 in response to control signals from the ECU 41. The motor ECU 43 is arranged to output data indicative of operating conditions of the motor-generator 24 to the ECU 41 as needed.

The battery ECU 44 is connected with the battery 47 and the ECU 41. The battery ECU 44 is configured to regulate the battery 47. The battery ECU 44 is arranged to input therein signals needed to regulate the battery 47. The signals needed to regulate the battery 47 include such as, for example, a signal indicative of voltage between the terminals from the battery voltage sensor 471, and a signal indicative of the discharge and charge current from the battery current sensor 472, and a signal indicative of battery temperature from the battery temperature sensor 473.

The battery ECU 44 is configured to communicate with the ECU 41. The battery ECU 44 is arranged to output data indicative of condition of the battery 47 to the ECU 41 as needed. In order to manage the battery 47, the battery ECU 44 is configured to calculate the SOC on the basis of an integrated value of the discharge and charge current detected by the battery current sensor 472.

The battery ECU 44 is arranged to output a signal indicative of a state that the SOC is lower than a predetermined threshold level to the ECU 41 in response to the SOC being lower than the predetermined threshold level. Under this condition, the ECU 41 is configured to set the engine start request flag to "ON". Therefore, the battery ECU 44, collecting with the coolant temperature sensor 18, constitutes an engine start request detection unit.

The transmission ECU 45 is connected with the automatic transmission 30 and the ECU 41. The transmission ECU 45 is configured to control the lock-up clutch 96 of the torque converter 32, and to change the gear position of the transmission mechanism 35.

The transmission ECU 45 is configured to communicate with the ECU 41. The transmission ECU 45 is configured to perform a shift control to change the gear position of the transmission mechanism 35 in accordance with the signal from the ECU 41. The transmission ECU 45 is arranged to output data indicative of operating condition of the transmission mechanism 35 and the torque converter 32 to the ECU 41 as needed.

The engine 10, the motor-generator 24 and the clutch 22 as mentioned above collectively constitute the vehicle control apparatus which starts the engine 10 by the motor-generator 24 with the clutch 22 taking the engaging state, thus constructing the vehicle control apparatus according to the present invention. To start the engine 10 by the motor-generator 24 under the state that the vehicle is stopped, the vehicle control apparatus according to the present invention is designed to synchronize the rotation of the engine 10 with the rotation of the motor-generator 24 at the synchronous rotational speed lower than the target rotational speed, to increase a rotational speed of the engine 10 by the motor-generator 24 from the synchronous rotational speed to the target rotational speed, and to start the engine 10 at target rotational speed.

The ECU 41 is configured to store the predetermined synchronous rotational speed and the predetermined target rotational speed in the RAM 412. The target rotational speed at which the engine 10 is started may be, for example, about 1000 rpm. The synchronous rotational speed is set at lower than the target rotational speed and higher than a speed at which the oil pump 34 can actuate the clutch 22. The synchronous rotational speed may be, for example, about 400 rpm.

The synchronous rotational speed may preferably be as low as possible, so that the clutch loss becomes lower, as well as the power consumption of the motor-generator 24 becomes lower. The synchronous rotational speed, however, needs to be sufficient at least to actuate the clutch 22. The target rotational speed and the synchronous rotational speed are obviously not fixed to be 1000 rpm and 400 rpm, respectively. In the present embodiment, the target rotational speed and the synchronous rotational speed are predetermined, but these speeds may be determined each time of starting the engine on the basis of such as, for example, the battery temperature and SOC.

The vehicle control apparatus according to the present invention includes the engine rotational speed sensor 19, the motor-generator speed sensor 243, the engine start request detection means for detecting the request of starting the engine 10, the motor ECU 43 operable to control the rotational speed and the output torque of the motor-generator 24, a clutch switching unit for switching the clutch 22 from the disengaging state to the engaging state, and the ECU 41. The ECU 41 has the clutch flag, and is configured to control the clutch switching unit by turning the clutch flag between "ON" and "OFF".

The ECU 41 is configured to control the motor ECU 43 to increase a motor rotational speed $N_M$ to the synchronous rotational speed and to control the clutch switching unit to switch the clutch 22 to take the engaging state, in response to a signal indicative of request to start the engine 10 from the engine start request detection means. The ECU 41 is further configured to synchronize an engine rotational speed $N_E$ with the motor rotational speed $N_M$ by controlling the motor ECU 43 to increase the compensating torque $T_M$ of the motor-generator 24 so as to increase the engine rotational speed $N_E$. The ECU 41 is configured to increase the motor rotational speed $N_M$ to the target rotational speed, after synchronizing the engine rotational speed $N_E$ with the motor rotational speed $N_M$, to have the engine 10 driven to start rotating and firstly ignited.

In addition, the vehicle control apparatus according to the present invention includes the C1 clutch 35a adapted to take a transmission state between a disengaging state where the wheels are disconnected from the electric motor and an engaging state where the wheels are connected with the electric motor, and an AT clutch switching unit for switching the C1 clutch 35a to take between the disengaging state and the engaging state. The ECU 41 has an AT clutch flag, and is configured to control the AT clutch switching unit by turning an AT clutch flag "ON" or "OFF".

In the vehicle control apparatus according to the present invention, the ECU 41 is configured to control the AT clutch switching unit to have the C1 clutch 35a take the disengaging state at least after the engine rotational speed $N_E$ is synchronized with the motor rotational speed $N_M$. Additionally, in the vehicle control apparatus according to the present invention, the ECU 41 is configured to control the AT clutch switching unit to have the C1 clutch 35a take the disengaging state after the motor-generator 24 begins to rotate.

The vehicle control apparatus according to the present invention has the mechanical oil pump 34 driven by the motor-generator 24. The clutch 22 is adapted to be actuated by the hydraulic oil discharged from the oil pump 34. The hydraulic pressure regulating valve 39 controlled by the ECU 41 is adapted to regulate the amount of the hydraulic oil supplied from the oil pump 34.

The operation of the vehicle control apparatus will be explained below.

The operation starts under the state that the hybrid vehicle is stopped where both of the engine 10 and the motor-generator 24 are stopped, and an ignition switch is "ON".

Figure 3:
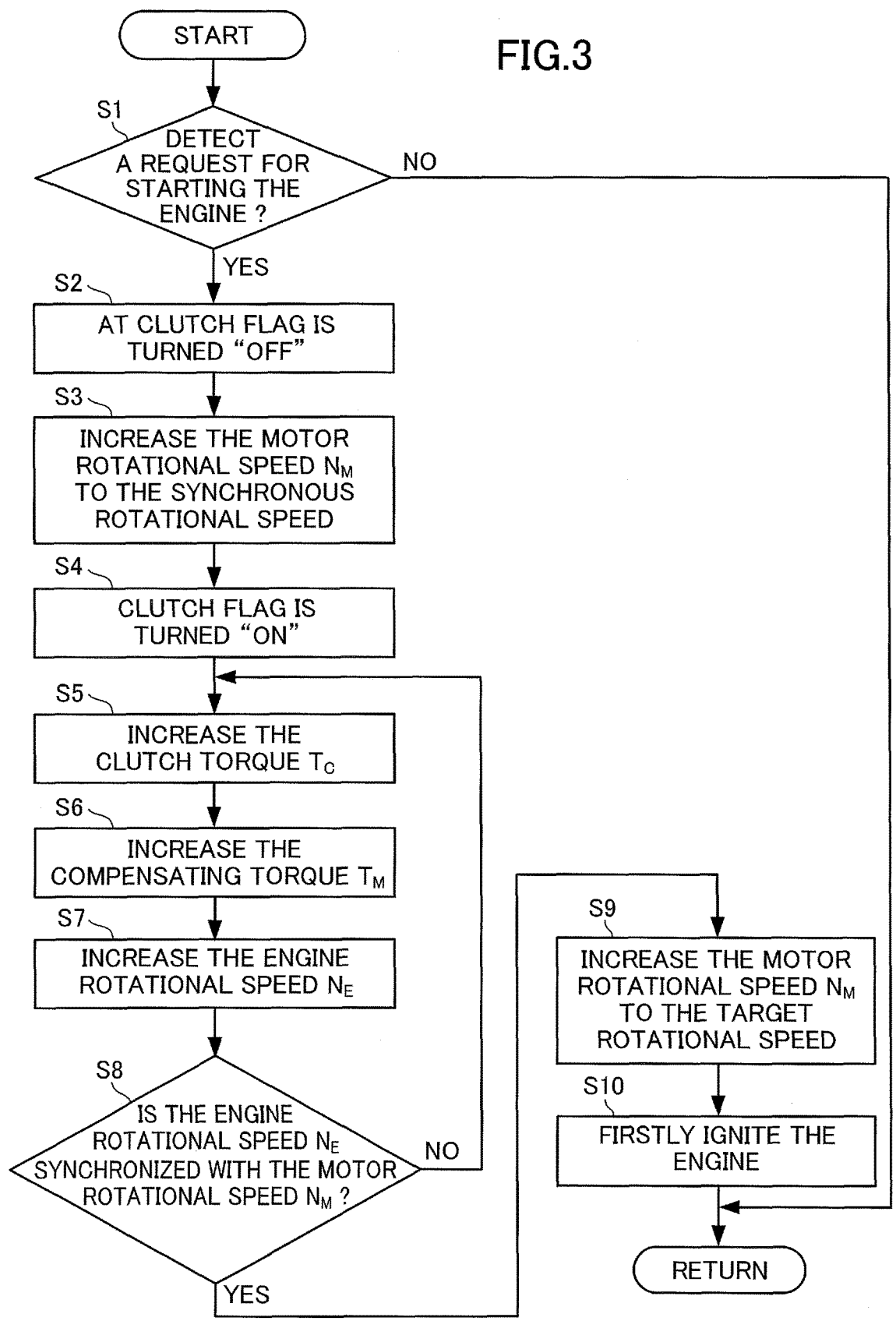
FIG. 3 is a flow chart of an operation of the vehicle control apparatus according to the embodiment of the present invention.

As shown in FIG. 3, the ECU 41 determines whether or not a request for starting the engine 10 is detected (step S1). The engine 10 is requested to start in cases such as, for example, that short of the SOC is detected by the battery ECU 44 and that the coolant temperature detected by the coolant temperature sensor 18 is lower than a predetermined threshold temperature.

The ECU 41 controls the engine 10 to start in order to increase a quantity of charged electricity of the battery 47 in response to short of the SOC detected by the engine ECU 44. The ECU 41 controls the engine 10 to start in order to prevent performance of the battery 47 from being deteriorated under low temperature in response to the coolant temperature detected by the coolant temperature sensor 18 to be lower than the predetermined threshold temperature.

In case where the ECU 41 determines that the request for starting the engine 10 is not detected (step S1; NO), the ECU 41 returns the operation to a main routine. In case where the ECU 41 determines that the request for starting the engine 10 is detected (step S1; YES), the ECU 41 turns a flag of C1 clutch 35a, i.e., the AT clutch flag "OFF" (step S2). The ECU 41 then controls the AT clutch switching unit to have the C1 clutch 35a take from the engaging state to the disengaging state with slipping.

The ECU 41 then controls the motor ECU 43 to increase the motor rotational speed $N_M$ to the synchronous rotational speed (step S3). The ECU 41 inputs therein the motor rotational speed $N_M$ constantly detected by the motor rotational speed sensor 243, and regulates the motor rotational speed $N_M$ with a feed back control.

The ECU 41 turns a flag indicative of a state of the clutch 22, i.e., the clutch flag "ON", after the motor rotational speed $N_M$ is stable at the synchronous rotational speed (step S4). Consequently, the ECU 41 controls the clutch 22 to take gradually from the disengaging state to the engaging state with the clutch controlling means.

In response to changing the clutch 22 gradually to take from the disengaging state to the engaging state by the ECU 41, clutch torque $T_C$ is gradually increased (step S5). The ECU 41 increases the compensating torque $T_M$ of the motor-generator 24 with the motor ECU 43 (step S6). In this embodiment, the ECU 41 controls the compensating torque $T_M$ to increase along the increase of the clutch torque $T_C$ keeping the compensating torque $T_M$ slightly less than the clutch torque $T_C$.

With the clutch 22 gradually taking from the disengaging state to the engaging state, the crankshaft 11 of the engine 10 is gradually driven by the motor-generator 24, and the engine rotational speed $N_E$ is gradually increased (step S7). The ECU 41 inputs therein the engine rotational speed $N_E$ constantly detected by the engine rotational speed sensor 19.

The ECU 41 determines whether or not the engine rotational speed $N_E$ synchronizes with the motor rotational speed $N_M$ (step S8). This means that the ECU 41 determines whether or not the engine rotational speed $N_E$ is equal to the motor rotational speed $N_M$. In case where the ECU 41 determines that the engine rotational speed $N_E$ does not synchronize with the motor rotational speed $N_M$ (step S8: NO), the ECU 41 waits until the clutch torque $T_C$ is increased (step S5).

In case where the ECU 41 determines that the engine rotational speed $N_E$ synchronizes with the motor rotational speed $N_M$ (step S8: YES), the ECU 41 controls the motor ECU 43 to increase the motor rotational speed $N_M$ to the target rotational speed (step S9). The engine rotational speed $N_E$ is increased to the target rotational speed in response to the increasing motor rotational speed $N_M$ to the target rotational speed, by the reason that the engine rotational speed $N_E$ synchronizes with the motor rotational speed $N_M$. The engine 10 is firstly ignited and started (step S10), after the engine rotational speed $N_E$ is reached to the target speed and is stable.

The operation in case that the request for starting the engine 10 is arisen where the engine 10 and the motor-generator 24 is stopped and the ignition switch takes "ON" in the stopped hybrid vehicle will hereinafter be described in line with the timing diagram shown in FIG. 4.

Figure 4:
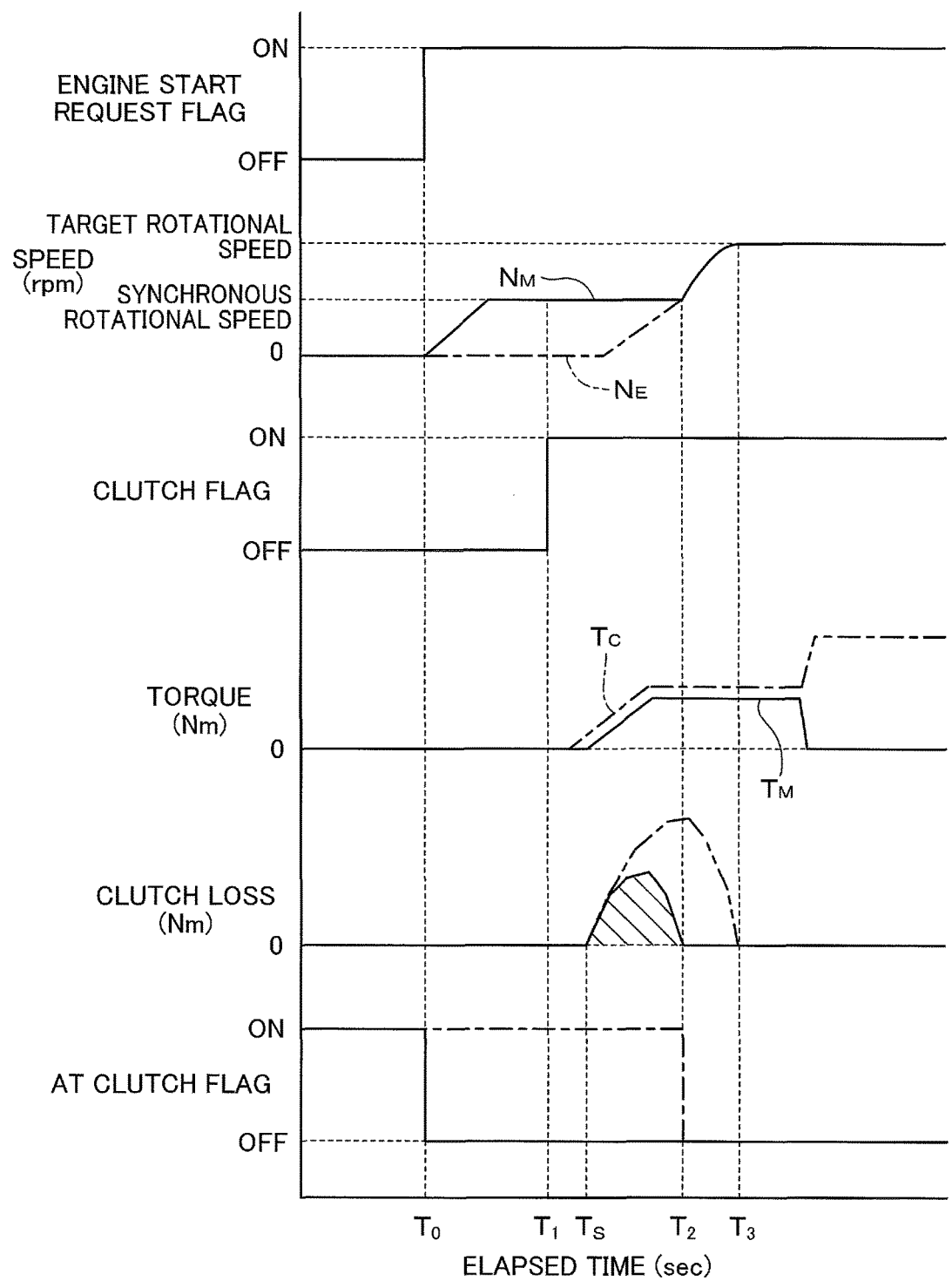
FIG. 4 is a timing chart of the operation of the vehicle control apparatus according to the embodiment of the present invention.
Figure 5:
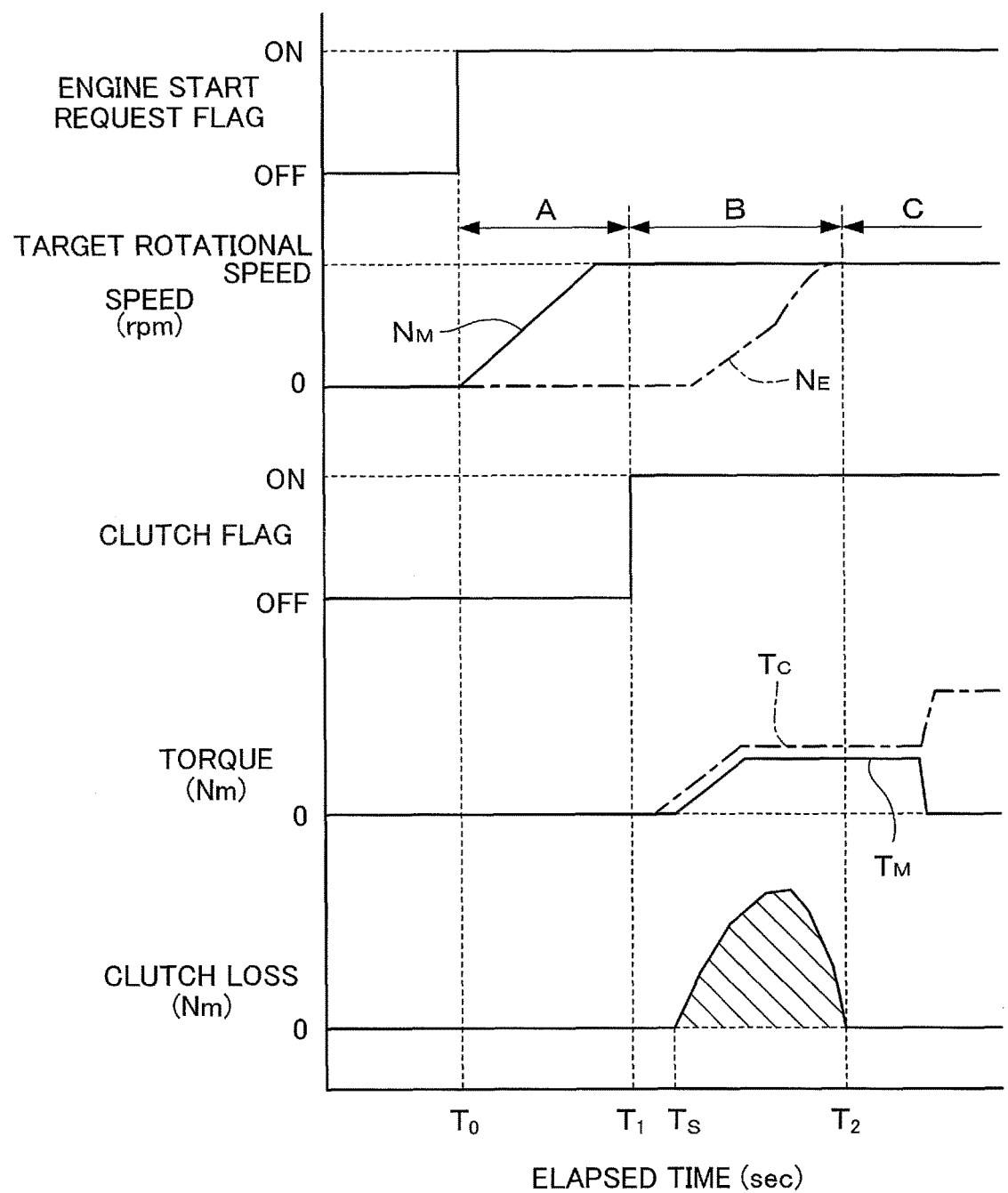
FIG. 5 is a timing chart of an operation of a conventional vehicle control apparatus.
Figure 6:
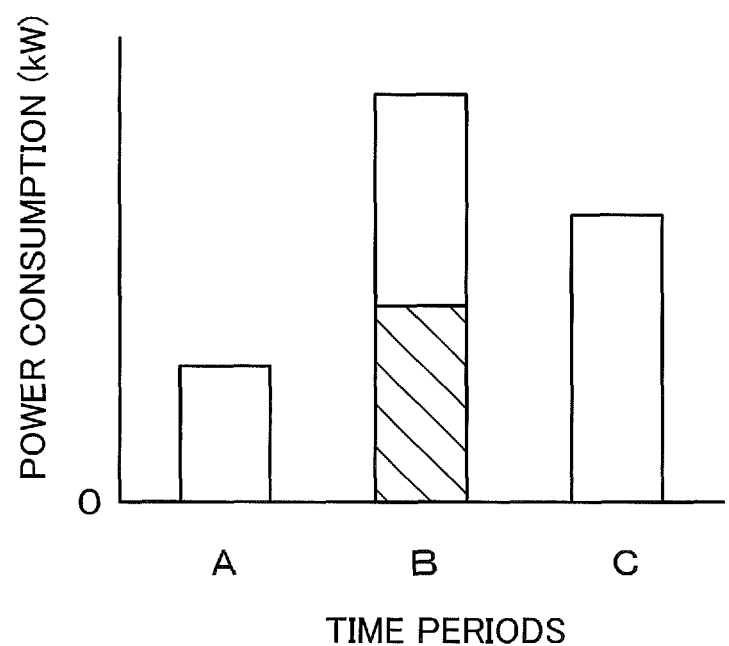
FIG. 6 is a graph of power consumption of time periods A to C respectively defined in FIG. 5 representing the operation of the conventional vehicle control apparatus.

As shown in FIG. 4, the clutch flag is "OFF" and the clutch 22 takes the disengaging state, while the engine 10 and the motor-generator 24 are stopped. In addition, while the engine 10 and the motor-generator 24 are stopped, the AT clutch flag is "ON" and the C1 clutch 35a takes the engaging state. The motor rotational speed $N_M$ and the engine rotational speed $N_E$ are 0.

At a time $T_0$, the ECU 41 turns the engine start request flag "ON" and the AT clutch flag "OFF" in response to detection of the request to start the engine 10. The ECU 41 controls the AT clutch switching unit to have the C1 clutch 35a take from the engaging state to the disengaging state with slipping.

The ECU 41 controls the motor ECU 43 to have the motor-generator 24 started. The motor rotational speed $N_M$ is increased after the motor-generator 24 is started. The ECU 41 waits for the motor rotational speed $N_M$ to be increased to the synchronous rotational speed and to become stable.

At a time $T_1$, The ECU 41 turns the clutch flag "ON". The ECU 41 controls the clutch 22 to take gradually from the disengaging state to the engaging state. In response to changing the clutch 22 to take from the disengaging state to the engaging state, the clutch torque $T_C$ is increased. The ECU 41 increases the compensating torque $T_M$ of the motor-generator 24 with the motor ECU 43.

At a time $T_S$, the clutch 22 begins slipping and causes the clutch loss marked by the diagonal lines in FIG. 4. The crankshaft 11 of the engine 10 is driven by the motor-generator 24 through the clutch 22, and the engine rotational speed $N_E$ is increased At a time $T_2$, the clutch 22 takes the completely engaging state, resulting in the fact that the engine rotational speed $N_E$ synchronizes with the motor rotational speed $N_M$. This leads to the fact that the clutch loss is 0. The ECU 41 controls the motor ECU 43 to increase the motor rotational speed $N_M$ to the target rotational speed.

At a time $T_3$, the motor rotational speed $N_M$ and the engine rotational speed $N_E$ reach to the target speed. The engine 10 is firstly ignited and started, after the engine rotational speed $N_E$ is stable at the target rotational speed.

In case that the hybrid vehicle stops for the purpose of parking, or the like, with the engine 10 stopped, the oil pump 34 is stopped. The hydraulic oil is therefore not supplied to the piston unit of the clutch 22 from the oil pump 34. This results in the fact that a piston is disengaged from the multiple disc portion by a biasing force of a return spring. This means that the clutch 22 takes the disengaging state. At this time, the transmitting mechanism 35 forms the neutral range. In addition, the hydraulic pressure regulating valve 39 is opened.

In case that the hybrid vehicle stops for the purpose of parking, or the like, with the engine 10 stopped, the motor-generator 24 is supplied with electrical power in order to start the engine 10. The rotor 241 of the motor-generator 24 is rotated by the electrical power supplied to the motor-generator 24. The driving force of the rotating rotor 241 is transmitted to the oil pump 34 through a rotor case, a drum, a sleeve, the clutch output shaft 270 and the torque converter 32 in this sequence.

In this case, even if the rotor case is rotated, the driving force generated by the motor-generator 24 is not transmitted to the engine 10, by the reason that the clutch 22 and the one-way clutch 23 take the respective disengaging states. Likewise, even if the transmission mechanism input shaft 33 of the transmission mechanism 35 is rotated by rotation of the torque converter 32, the output shaft 37 of the transmission mechanism 35 is not rotated by the reason that the transmitting mechanism 35 forms the neutral range.

The hydraulic oil discharged from the oil pump 34 is supplied to the clutch 22. The piston slides toward the multiple disc portion to depress the multiple disc portion axially, thereby ensuring the clutch 22 to take the completely engaging state. Therefore, the driving force of the rotor 241 is transmitted to the crankshaft 11 through the rotor case, the multiple disc portion, a hub portion and the input portion 21 in this sequence. As a result, the engine 10 is started.

In case that the vehicle starts moving after the engine 10 is started, the driving force generated by the engine 10 is transmitted to the transmission mechanism 30 through the crankshaft 11, the input portion 21, the hub portion, the clutch 22, the rotor case, the drum, the sleeve and the clutch output shaft 270 in this sequence. The oil pump 34 is driven by the driving force transmitted to the automatic transmission 30. This leads to the fact that the hydraulic oil is continuously supplied to the clutch 22, thereby ensuring the clutch 22 to be kept in the completely engaging state. At this time, the shift position of the transmission 35 is set to one of forward positions or a reverse position. As a consequence, the driving force of the crankshaft 11 is transmitted to the driving wheels from the automatic transmission 30, with the result that the hybrid vehicle starts moving.

In case that the hybrid vehicle stops for the purpose of parking, or the like, with the engine 10 stopped, the hydraulic oil is not supplied to the piston unit of the clutch 22 from the oil pump 34 as described above, thereby ensuring the clutch 22 to take the disengaging state.

Under the condition as set forth above, in case that the vehicle starts moving only with the driving force of the motor-generator 24, the electric power is supplied to the motor-generator 24. In response to the electric power supplied to the motor-generator 24, the rotor 241 of the motor-generator 24 begins rotating. The driving force generated by the rotating rotor 241 is transmitted to the oil pump 34 through the rotor case, the drum, the clutch output shaft 270 and the torque converter 32 in this sequence.

Even if the rotor case is rotated, the driving force generated by the motor-generator 24 is not transmitted to the engine 10, by the reason that the clutch 22 and the one-way clutch 23 take the respective disengaging states. In addition, the hydraulic pressure regulating valve 39 is closed. As a result, the hydraulic oil discharged from the oil pump 34 is not supplied to the clutch 22.

The transmission mechanism input shaft 33 of the transmission mechanism 35 is rotated in response to rotation of the torque converter 32. At this time, the shift position of the transmission 35 is set to one of the forward positions or the reverse position. As a consequence, the driving force of the crankshaft 11 is transmitted to the driving wheels from the automatic transmission 30, with the result that the hybrid vehicle starts moving.

As can be seen from the foregoing description, it is to be understood that the vehicle control apparatus according to the present embodiment is designed to synchronize the engine rotational speed $N_E$ with the motor rotational speed $N_M$ at the synchronous rotational speed lower than the target rotational speed to have the engine 10 started. The vehicle control apparatus according to the present invention is designed to start the engine 10 after increasing the synchronized engine rotational speed $N_E$ to the target rotational speed by the motor-generator 24.

This leads to the fact that the clutch loss due to the slipping clutch 22 occurs within a time period between a time $T_S$ at which the clutch begins slipping under the state that the engine rotational speed is 0 and a time $T_2$ at which the engine rotational speed is synchronized with the motor rotational speed at the synchronous rotational speed. This means that the time period during which the clutch loss occurs becomes shorter than the long time period during which the clutch loss occurs to the conventional vehicle control apparatus, as shown by the two-dot chain line in FIG. 4, between the time $T_S$ at which the clutch begins slipping under the state that the engine rotational speed is 0 and a time $T_3$ at which the engine rotational speed is reached to the target speed.

Consequently, the vehicle control apparatus according to the present invention can reduce the clutch loss and the power consumption of the motor-generator 24, thereby enabling the battery 47 to downsize and improving fuel efficiency. In addition, because of the fact that the power consumption of the motor-generator 24 in starting the engine 10 is reduced, the vehicle control apparatus according to the present invention can improve start-up performance of the engine 10 even if the output voltage of the battery 47 is lowered under low temperature environment.

Further, the vehicle control apparatus according to the present embodiment is designed to turn the C1 clutch 35a the disengaging state at the time $T_0$ at which the motor-generator 24 begins rotating. This means that the ECU 41 is configured to remove a load of a driving wheel side from the motor-generator 24 at the time $T_0$ at which the motor-generator 24 begins rotating, thereby securing the output torque of the motor-generator 24.

As a result, the vehicle control apparatus according to the present invention can reduce power consumption needed to increase the motor rotational speed $N_M$ to the synchronizing speed, power consumption needed to increase the engine rotational speed $N_E$ to synchronize with the motor rotational speed $N_M$, and power consumption needed to drive the engine 10 to start rotating by the motor-generator 24. As described above, the vehicle control apparatus according to the present invention can reduce power consumption of the motor-generator 24, thereby enabling the battery 47 to downsize and improving fuel efficiency.

The vehicle control apparatus according to the present invention has the mechanical-type oil pump 34 driven by the motor-generator 24, and the clutch 22 is actuated by the hydraulic oil discharged from the oil pump 34. This leads to the fact that the vehicle control apparatus according to the present invention does not need to be provided with an electrical-type oil pump, thereby resulting in the fact that the vehicle control apparatus according to the present invention can simplify an electric system in comparison with a vehicle control apparatus needed to be provided with the electrical-type oil pump. In addition, the mechanical-type oil pump 34 mounted on the automatic transmission 30 can be applied for supplying the hydraulic oil not only to circulate the torque converter, but also to actuate the clutch 22, thereby resulting in the fact that the vehicle control apparatus according to the present invention can prevent the number of components from increasing.

In the vehicle control apparatus according to the present invention, the synchronous rotational speed is higher than a rotational speed needed to actuate the clutch 22 by the oil pump 34. This means that the synchronous rotational speed can be determined to a minimum rotational speed needed to actuate the clutch 22 with the hydraulic oil discharged from the oil pump 34, thereby resulting in the fact that the vehicle control apparatus according to the present invention can minimize the clutch loss while ensuring the clutch 22 to be actuated.

There has been previously described about the fact that the vehicle control apparatus according to the present embodiment is designed to turn the C1 clutch 35a to the disengaging state at the time $T_0$ at which the motor-generator 24 begins rotating. However, the vehicle control apparatus according to the present invention is not limited to have the construction as described above. The vehicle control apparatus according to the present invention may otherwise be designed to turn the C1 clutch 35a to the disengaging state at the time $T_3$ at which the engine rotational speed $N_E$ is synchronized with the motor rotational speed $N_M$. In this case, the vehicle control apparatus according to the present invention can reduce power consumption needed to drive the engine 10 to start rotating by the motor-generator 24 after the engine rotational speed $N_E$ is synchronized with the motor rotational speed $N_M$.

There has been previously described about the fact that, in the vehicle control apparatus according to the present embodiment, the C1 clutch 35a, directly connected with the transmission mechanism input shaft 33 of the transmission mechanism 35 and integrally rotatable with the transmission mechanism input shaft 33, constitutes the wheel disconnecting clutch. However, the vehicle control apparatus according to the present invention is not limited to have the construction as described above. The wheel disconnecting clutch may otherwise be constituted by other clutch arranged at the driving wheel side of the C1 clutch 35a, i.e., at the side of the output shaft 37. Alternatively, the wheel disconnecting clutch may be constituted by other clutch mounted on the automatic transmission 30.

There has been previously described about the fact that the vehicle control apparatus according to the present embodiment is designed to turn the wheel disconnecting clutch to the disengaging state at the predetermined timing. However, the vehicle control apparatus according to the present invention is not limited to have the construction as described above. The vehicle control apparatus according to the present invention may otherwise be designed not to turn the wheel disconnecting clutch the disengaging state, thereby making it possible to simplify the operation of the vehicle control apparatus according to the present invention.

There has been previously described about the fact that, in the vehicle control apparatus according to the present embodiment, the clutch 22 and the one-way clutch 23 are arranged adjacent to each other inside the inner circumference of the rotor 241. However, the vehicle control apparatus according to the present invention is not limited to have the construction as described above. The clutch 22 and the one-way clutch 23 may otherwise be arranged to overlap axially each other inside the inner circumference of the rotor 241.

As has been described above, the vehicle control apparatus according to the present invention applied to a vehicle including a clutch between an engine and a motor has an effect to decrease the loss due to slipping of the clutch while the engine is started by the motor, and is useful for a vehicle control apparatus of the hybrid vehicle.

REFERENCE SIGNS LIST

1 drive device
10 engine
20 driving unit
22 clutch
24 motor-generator
30 automatic transmission
32 torque converter
34 oil pump
35 transmission mechanism
35a C1clutch
40 control unit
41 ECU

The invention claimed is:

1. A vehicle control apparatus comprising:
an internal combustion engine;
an electric motor connected with wheels of a vehicle;
a clutch that switches between a disengaged state in which the internal combustion engine is disconnected from the electric motor and an engaged state in which the internal combustion engine is connected with the electric motor; and
a wheel disconnecting clutch that switches between a disengaged state in which the wheels are disconnected from the electric motor and an engaged state in which the wheels are connected with the electric motor, wherein
the vehicle control apparatus is configured to start the internal combustion engine by the electric motor after switching the clutch to the engaged state by:
controlling the electric motor to rotate and controlling the clutch to switch to the engaged state from the disengaged state to cause the internal combustion engine and the electric motor to both rotate at a synchronous rotational speed lower than a target rotational speed,
controlling the electric motor to increase a rotational speed of the internal combustion engine and the electric motor from the synchronous rotational speed to the target rotational speed, and
starting the internal combustion engine at the target rotational speed, and wherein the vehicle control apparatus is further configured to:
cause the wheel disconnecting clutch to switch to the disengaged state in response to starting rotation of the electric motor.

2. The vehicle control apparatus as set forth in claim 1, further comprising
a mechanical oil pump driven by the electric motor, wherein
the clutch is actuated with hydraulic oil discharged from the mechanical oil pump.

3. The vehicle control apparatus as set forth in claim 2, wherein
the synchronous rotational speed is higher than a rotational speed at which the clutch is actuated by the mechanical oil pump.

4. A vehicle control apparatus comprising:
an internal combustion engine;
an electric motor connected with wheels of a vehicle;
a clutch that switches between a disengaged state in which the internal combustion engine is disconnected from the electric motor and an engaged state in which the internal combustion engine is connected with the electric motor;
a wheel disconnecting clutch that switches between a disengaged state in which the wheels are disconnected from the electric motor and an engaged state in which the wheels are connected with the electric motor, and
an electronic control unit that is programmed to start the internal combustion engine by the electric motor after switching the clutch to the engaged state, wherein
the electronic control unit is programmed to:
control the electric motor to rotate and control the clutch to switch to the engaged state from the disengaged state to cause the internal combustion engine and the electric motor to both rotate at a synchronous rotational speed lower than a target rotational speed, control the electric motor to increase a rotational speed of the internal combustion engine and the electric motor from the synchronous rotational speed to the target rotational speed, start the internal combustion engine at the target rotational speed, and cause the wheel disconnecting clutch to switch to the disengaged state in response to starting rotation of the electric motor.

5. The vehicle control apparatus as set forth in claim 4, further comprising a mechanical oil pump driven by the electric motor, wherein the clutch is actuated with hydraulic oil discharged from the mechanical oil pump.

6. The vehicle control apparatus as set forth in claim 5, wherein the synchronous rotational speed is higher than a rotational speed at which the clutch is actuated by the mechanical oil pump.

* * * * *